United States Patent
Herlambang et al.

(10) Patent No.: US 10,166,803 B2
(45) Date of Patent: Jan. 1, 2019

(54) RECORDING MEDIUM

(71) Applicant: CANON KABUSHIKI KAISHA, Tokyo (JP)

(72) Inventors: Olivia Herlambang, Kawasaki (JP); Yoshiyuki Nagase, Kawasaki (JP); Masaya Asao, Yokohama (JP); Takeshi Ota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/463,199

(22) Filed: Mar. 20, 2017

(65) Prior Publication Data

US 2017/0282628 A1    Oct. 5, 2017

(30) Foreign Application Priority Data

Mar. 31, 2016    (JP) ................... 2016-072671

(51) Int. Cl.
  *B41M 5/50*    (2006.01)
  *B41M 5/52*    (2006.01)
  *C09D 11/00*    (2014.01)
  *C09D 11/30*    (2014.01)

(52) U.S. Cl.
  CPC .............. *B41M 5/502* (2013.01); *B41M 5/52* (2013.01); *C09D 11/00* (2013.01); *C09D 11/30* (2013.01); *B41M 5/5218* (2013.01); *B41M 5/5254* (2013.01); *B41M 5/5281* (2013.01)

(58) Field of Classification Search
  CPC ...... B41M 5/50; B41M 5/5218; B41M 5/502; B41M 5/5254; B41M 5/5281
  See application file for complete search history.

(56) References Cited

U.S. PATENT DOCUMENTS

| | | | |
|---|---|---|---|
| 5,720,806 A | 2/1998 | Fujii et al. | |
| 7,935,397 B2 | 5/2011 | Okuda et al. | |
| 7,955,669 B2 | 6/2011 | Nagase et al. | |
| 8,163,360 B2 | 4/2012 | Asao et al. | |
| 8,247,042 B2 | 8/2012 | Asakawa et al. | |
| 8,247,043 B2 | 8/2012 | Tanaka et al. | |
| 8,252,392 B2 | 8/2012 | Oguri et al. | |
| 8,252,393 B2 | 8/2012 | Nagashima et al. | |
| 8,486,499 B2 | 7/2013 | Nilo et al. | |
| 8,524,336 B2 | 9/2013 | Oguri et al. | |
| 8,545,008 B2 | 10/2013 | Asao et al. | |
| 8,609,209 B2 | 12/2013 | Taguri et al. | |
| 8,795,798 B2 | 8/2014 | Oguri et al. | |
| 8,846,166 B2 | 9/2014 | Herlambang et al. | |
| 2006/0068132 A1* | 3/2006 | Nakao ................... | G03F 7/2018 428/32.34 |
| 2009/0324857 A1 | 12/2009 | Okuda et al. | |
| 2010/0291363 A1 | 11/2010 | Koike et al. | |

FOREIGN PATENT DOCUMENTS

| | | | | |
|---|---|---|---|---|
| JP | H10-272832 A | | 10/1998 | |
| JP | 2000-225767 A | * | 8/2000 | ............. B41M 5/00 |
| JP | 2000-318304 A | | 11/2000 | |
| JP | 2001-001629 A | | 1/2001 | |
| JP | 2001-105717 A | | 4/2001 | |
| JP | 2002-052812 A | | 2/2002 | |
| JP | 2002-127588 A | * | 5/2002 | ............. B41M 5/00 |

OTHER PUBLICATIONS

Jul. 24, 2017 extended European Search Report in European Patent Application No. 17000488.1.

* cited by examiner

*Primary Examiner* — Betelhem Shewareged
(74) *Attorney, Agent, or Firm* — Venable LLP

(57) ABSTRACT

A recording medium including a substrate and an ink-receiving layer provided on the substrate. The ink-receiving layer contains a silica particle and a water-insoluble resin. The silica particle satisfies the following expressions 1 and 2 when the average pore radius thereof determined by the BJH method is taken as r (nm), and the oil absorption thereof measured by the linseed oil droplet method is taken as V (ml/100 g):

$r \leq 5.0$ (nm)    expression 1:

$V/r \geq 80$ ((ml/100 g)/nm).    expression 2:

10 Claims, No Drawings

RECORDING MEDIUM

BACKGROUND OF THE INVENTION

Field of the Invention

The present invention relates to a recording medium.

Description of the Related Art

In recent years, a recorded article obtained by recording an image on a recording medium by means of an image recording method of an ink jet system may have been displayed outdoors in some cases. In a recording medium used for the formation of an image for being displayed outdoors, an ink-receiving layer thereof is required to have higher scratch resistance and water resistance than a conventional recording medium while retaining ink absorbency comparable to that of the conventional recording medium.

A recording medium obtained by causing a water-insoluble resin such as an acrylic resin and a urethane resin to be contained in an ink-receiving layer has heretofore been known as a technique for improving the scratch resistance and water resistance of the ink-receiving layer (Japanese Patent Application Laid-Open Nos. 2000-318304, 2002-052812, 2001-001629, 2001-105717 and H10-272832). Japanese Patent Application Laid-Open No. 2000-318304 describes a recording medium having an ink-receiving layer containing an acrylic resin emulsion, polyvinyl alcohol, silica and a melamine-based crosslinking agent at a specific ratio to improve the water resistance. Japanese Patent Application Laid-Open No. 2002-052812 describes a recording medium having an ink-receiving layer containing at least one of silica, an acrylic resin and a urethane resin, and a water-soluble aluminum salt to improve the water resistance and scratch resistance. Japanese Patent Application Laid-Open No. 2001-001629 describes a recording medium having an ink-receiving layer containing silica and a water-insoluble dispersion type cationic acrylic resin to improve the water resistance. Japanese Patent Application Laid-Open No. 2001-105717 describes a recording medium having an ink-receiving layer containing a water-insoluble resin, a pigment, a water-soluble cationic resin and a surfactant to improve the ink absorbency, water resistance and surface strength. Japanese Patent Application Laid-Open No. H10-272832 describes a recording medium having an ink-receiving layer containing amorphous silica, a water-insoluble resin and a water-soluble resin on a resin film to improve the water resistance and strength.

SUMMARY OF THE INVENTION

The present invention is intended to provide a recording medium having an ink-receiving layer excellent in ink absorbency, film strength and water resistance.

In an aspect of the present invention, there is provided a recording medium having a substrate and an ink-receiving layer provided on the substrate, wherein the ink-receiving layer contains a silica particle and a water-insoluble resin, and the silica particle satisfies the following expressions 1 and 2 when an average pore radius thereof determined by the BJH method is taken as r (nm), and an oil absorption thereof measured by the linseed oil droplet method is taken as V (ml/100 g):

$r \leq 5.0$ (nm)  expression 1:

$V/r \geq 80$ ((ml/100 g)/nm). expression 2:

Further features of the present invention will become apparent from the following description of exemplary embodiments.

DESCRIPTION OF THE EMBODIMENTS

Preferred embodiments of the present invention will now be described in detail.

In order to develop the uses of the recording medium for formation of an image to be displayed outdoors, it is important to more improve the water resistance and film strength of the ink-receiving layer while retaining good ink absorbency of the ink-receiving layer. The present inventors have carried out an extensive investigation with a view toward providing a recording medium having an ink-receiving layer excellent in ink absorbency, film strength and water resistance, thus leading to the completion of the present invention.

The recording medium according to the present invention has a substrate and an ink-receiving layer provided on the substrate. The ink-receiving layer contains a silica particle and a water-insoluble resin.

The silica particle satisfies the following expressions 1 and 2 when the average pore radius thereof determined by the BJH method is taken as r (nm), and the oil absorption thereof measured by the linseed oil droplet method is taken as V (ml/100 g):

$r \leq 5.0$ (nm) expression 1:

$V/r \geq 80$ ((ml/100 g)/nm). expression 2:

The ink-receiving layer contains the water-insoluble resin, thereby achieving such water resistance as to be usable for the outdoor posting.

When the water-insoluble resin is used, however, the ability to bind the silica particle is low, so that the film strength of the resulting ink-receiving layer may become weak in some cases. According to the investigation by the present inventors, it has been found that this is caused by the absorption of the water-insoluble resin in the silica particle itself, thereby failing to utilize a sufficient amount of the resin required for binding the silica particle.

In more detail, it is inferred that the following phenomenon occurs.

The silica particle mutually aggregates and is bound by the resin, thereby forming the ink-receiving layer. The above-described absorption phenomenon of the water-insoluble resin is such a phenomenon that the water-insoluble resin is absorbed in a pore of the silica particle. As a result, the amount of a binder including the water-insoluble resin which binds the particles is reduced, so that the film strength of the ink-receiving layer becomes weak, and the particles are easily dissociate when external force is applied.

The water-insoluble resin is more easily absorbed as the average pore radius of the silica particle becomes larger. According to the investigation by the present inventors, it has been found that there is need for the silica particle to have an average pore radius of 5.0 nm or less for inhibiting the absorption of the water-insoluble resin by the silica particle. If the average pore radius of the silica particle is larger than 5.0 nm, the water-insoluble resin is easier to enter into the pore of the silica particle, and so the amount of the water-insoluble resin absorbed increases. As a result, the amount of the resin left between the particles decreases to lower the film strength of the resulting ink-receiving layer.

In addition, since the water-insoluble resin has poor ability to absorb water compared with a water-soluble resin, in some cases, the ink absorbency may be often lowered compared with an ink-receiving layer containing the water-soluble resin. As a result, the pore of the silica particle plays a major role in the ink absorbency with respect to the ink-receiving layer containing the water-insoluble resin. The ink absorbency is promoted by the capillary force of the pore of this silica particle. Accordingly, it is important for the silica particle to ensure a sufficient pore volume capable of contributing to the ink absorbency even when the average pore radius of the silica particle is controlled to 5.0 nm or less for achieving sufficient film strength for the ink-receiving layer. When the average pore radius of the silica particle is controlled to 5.0 nm or less, the amount of the water-insoluble resin having entered into the pore can be suppressed as described above. However, the blocking of the pore caused by the entering of the water-insoluble resin into the pore of the silica particle cannot be completely inhibited. In other words, in order for the ink-receiving layer to retain excellent ink absorbency, it is necessary to leave the volume of pores sufficient for the ink absorbency compared with the volume of pores that are blocked by the absorption of the water-insoluble resin.

The liquid absorbing ability of the silica particle exhibits a high correlation with the oil absorption. In other words, when the oil absorption of the silica particle is high, the ink absorbing ability thereof can be sufficiently retained even when the water-insoluble resin is absorbed. It is thus necessary to use a silica particle capable of inhibiting the absorption of the water-insoluble resin by controlling the average pore radius to 5.0 nm or less and capable of ensuring a sufficient oil absorption, namely, ink absorbency even when the pore of the silica particle partially absorbs the water-insoluble resin. The present inventors have found the conditions for selecting such a silica particle, that is, the conditions satisfying the expressions 1 and 2, by which an oil absorption sufficient to achieve the intended ink absorbency can be ensured even when the average pore radius is as small as 5.0 nm or less, to complete the present invention.

For example, when other production conditions than the conditions defined by the expressions 1 and 2 are the same, there is the following difference in properties between a case satisfying the expressions 1 and 2 and a case not satisfying the expressions 1 and 2.

First, in the case of a silica particle of r 5.0 (nm) and V/r<80 ((ml/100 g)/nm), the average pore radius of the silica particle is 5.0 nm or less to attain excellent film strength, but sufficient ink absorbency is not achieved because V/r is lower than 80 ((ml/100 g)/nm). Then, in the case of a silica particle of r 5.0 (nm) and V/r≥80 ((ml/100 g)/nm) according to the present invention, excellent film strength and ink absorbency can be achieved. In addition, in the case of a silica particle of r>5.0 (nm) and V/r≥80 ((ml/100 g)/nm), a large amount of the water-insoluble resin is absorbed in the silica particle because the average pore radius of the silica particle is larger than 5.0 nm, and so the film strength is lowered.

As described by the above-described mechanisms, the respective constituent features give an effect synergistically, whereby the effect of the present invention, that is, the improvements in all the ink absorbency, film strength and water resistance can be achieved at a high level.

The respective components constituting the recording medium according to the present invention will hereinafter be described respectively.

Substrate

As the substrate, those already utilized for a recording medium or those usable for a recording medium and capable of functioning as a support of an ink-receiving layer may be utilized without limitation. As examples of the substrate, there are mentioned that composed of only base paper, that composed of only plastic film and that composed of only cloth. In addition, that provided with a plurality of layers may also be used as the substrate. Specifically, that having a paper base and a resin layer, that is, a resin-coated substrate, is mentioned. In the present invention, the resin-coated substrate, plastic film or cloth is favorably used as the substrate from the viewpoint of using the recording medium for the outdoor display.

In the present invention, the thickness of the substrate is favorably 50 µm or more to 400 µm or less, more favorably 70 µm or more to 200 µm or less. Incidentally, the thickness of the substrate in the present invention is calculated according to the following method. First, a section of the recording medium is cut out by a microtome, and that section is observed through a scanning electron microscope. The thickness of the substrate is then measured at arbitrary 100 or more points thereof, and the average value thereof is taken as the thickness of the substrate. Incidentally, the thicknesses of other layers and films in the present invention are also calculated according to the same method.

(1) Resin-Coated Substrate

Base Paper

The base paper is made by using wood pulp as a main raw material and adding synthetic pulp such as polypropylene and synthetic fiber such as nylon or polyester as needed. As examples of the wood pulp, there are mentioned Laubholz bleached kraft pulp (LBKP), Laubholz bleached sulfite pulp (LBSP), Nadelholz bleached kraft pulp (NBKP), Nadelholz bleached sulfite pulp (NBSP), Laubholz dissolving pulp (LDP), Nadelholz dissolving pulp (NDP), Laubholz unbleached kraft pulp (LUKP) and Nadelholz unbleached kraft pulp (NUKP). These may be used either singly or in any combination thereof. Among the wood pulps, LBKP, LBSP, NBSP, LDP or NDP which contains a large amount of short fiber components is favorably used. Chemical pulp (sulfate pulp or sulfite pulp) which contains little impurities is favorable as the pulp. In addition, pulp whose brightness is improved by conducting a bleaching treatment is also favorable. Incidentally, a sizing agent, a white pigment, a paper strengthening agent, a fluorescent whitening agent, a water retaining agent, a dispersant, a softening agent and/or the like may be suitably added into the base paper.

In the present invention, the thickness of the base paper is favorably 50 µm or more to 130 µm or less, more favorably 90 µm or more to 120 µm or less. Incidentally, the thickness of the base paper in the present invention is calculated according to the same method as in the thickness of the substrate.

The paper density of the base paper as defined by JIS P 8118 in the present invention is favorably 0.6 g/cm$^3$ or more to 1.2 g/cm$^3$ or less, more favorably 0.7 g/cm$^3$ or more to 1.2 g/cm$^3$ or less.

Resin Layer

The resin layer may be provided on only one surface or both surfaces of the base paper. In the present invention, the resin layer is favorably provided on both surfaces of the base paper. In addition, when the base paper is coated with a resin, the resin layer may be provided so as to coat a part of a surface of the base paper. The coating rate of the resin layer (an area of the surface of the base paper coated with the resin layer/the whole area of the surface of the base paper) is favorably 70% or more, more favorably 90% or more, particularly favorably 100%, that is, the whole surface of the base paper being coated with the resin layer.

In addition, the thickness of the resin layer in the present invention is favorably 20 µm or more to 60 µm or less, more favorably 35 µm or more to 50 µm or less. When the resin layer is provided on both surfaces of the base paper, the thicknesses of the resin layers on both surfaces favorably satisfy the above range, respectively. The resin used in the resin layer is favorably a thermoplastic resin. As examples of the thermoplastic resin, there are mentioned an acrylic resin, an acrylic silicone resin, a polyolefin resin and a styrene-butadiene copolymer. Among these, the polyolefin resin is favorably used. Incidentally, the polyolefin resin in the present invention means a polymer obtained by using an olefin as a monomer. As specific examples of the polyolefin resin, there are mentioned homopolymers and copolymers of ethylene, propylene, isobutylene and the like. These may be used either singly or in any combination thereof. Among these, polyethylene is favorably used. Low density polyethylene (LDPE) or high density polyethylene (HDPE) is favorably used as the polyethylene.

In the present invention, the resin layer may contain a white pigment, a fluorescent whitening agent, a bluing agent such as ultramarine blue and/or the like for adjusting opacity, brightness and hue. Among these, the white pigment is favorably contained because the opacity can be improved. As examples of the white pigment, there are mentioned rutile-type and anatase-type titanium oxides. When the white pigment is used, the content of the white pigment in the resin layer is favorably 3 g/m$^2$ or more to 30 g/m$^2$ or less. Incidentally, when the resin layer is provided on both surfaces of the base paper, the total content of the white pigment in the resin layers on both surfaces favorably satisfies the above range. In addition, the content of the white pigment in the resin layer is favorably 25% by mass or less with respect to the content of the resin. If the content of the white pigment exceeds 25% by mass, the dispersion stability of the white pigment may not be sufficiently achieved in some cases.

The arithmetic average roughness Ra of the resin layer as defined by JIS B 0601:2001 in the present invention is favorably 0.12 µm or more to 0.18 µm or less, more favorably 0.13 µm or more to 0.15 µm or less. In addition, the average length RSm of a roughness curve element of the resin layer as defined by JIS B 0601:2001 in the present invention is favorably 0.01 mm or more to 0.20 mm or less, more favorably 0.04 mm or more to 0.15 mm or less.

(2) Plastic Film

In the present invention, a plastic means that containing, as a component, a polymer having a weight-average molecular weight of 10,000 or more at a proportion of 50% by mass or more, and a plastic film means that obtained by processing the plastic into a film form. The plastic used in the plastic film is a thermoplastic polymer. As specific examples of the thermoplastic polymer, there are mentioned a vinyl-based plastic, a polyester-based plastic, a cellulose ester-based plastic, a polyamide-based plastic and a heat-resistant engineering plastic. As examples of the vinyl-based plastic, there are mentioned polyethylene, polyvinyl chloride, polyvinylidene chloride, polyvinyl alcohol, polystyrene, polypropylene and fluorine-containing resins. As examples of the polyester-based plastic, there are mentioned polycarbonate and polyethylene terephthalate. As examples of the cellulose ester-based plastic, there are mentioned cellulose diacetate, cellulose triacetate and cellulose acetate butyrate. As examples of the polyamide-based plastic, there are mentioned nylon 6, nylon 66 and nylon 12. As examples of the heat-resistant engineering plastic, there are mentioned polyimide, polysulfone, poly(ether sulfone), polyphenylene sulfide, poly(ether ether ketone) and polyether imide. These may be used either singly or in any combination thereof. Among these, polyvinyl chloride, polypropylene, polycarbonate or polyethylene terephthalate is favorably used from the viewpoints of durability and cost.

In addition, synthetic paper obtained by subjecting the above-described plastic to such a treatment as a chemical treatment, surface coating or internal addition to improve the opacity thereof may also be used as the plastic film in the present invention. As the chemical treatment, there is mentioned a method in which the surfaces of the plastic film are dipped in an organic solvent such as acetone or methyl isobutyl ketone, thereby producing a swelled layer, and then the swelled layer is dried and solidified with another organic solvent such as methanol. As the surface coating, there is mentioned a method of forming a layer composed of a white pigment such as calcium carbonate or titanium oxide and a binder on a surface of the plastic. In addition, the internal addition includes a method of mixing a pigment such as calcium carbonate, titanium oxide, zinc oxide, white carbon, clay, talc or barium sulfate into the plastic as a filler. Further, a foamed plastic film whose opacity is improved by adding a polybutylene terephthalate fine particle, a polycarbonate fine particle, a polyester resin, a polycarbonate resin or the like to form voids in the plastic may also be used.

In the present invention, the thickness of the plastic film is favorably 50 µm or more to 300 µm or less, more favorably 75 µm or more to 135 µm or less.

The glass transition temperature (Tg) of the plastic used in the plastic film in the present invention is favorably −20° C. or more to 150° C. or less, more favorably −20° C. or more to 80° C. or less. Incidentally, the glass transition temperature in the present invention can be measured by, for example, the differential scanning calorimetry (DSC method).

The plastic density of the plastic film as defined by JIS K 7112:1999 in the present invention is favorably 0.6 g/cm$^3$ or more to 1.5 g/cm$^3$ or less, more favorably 0.7 g/cm$^3$ or more to 1.4 g/cm$^3$ or less. The water absorption rate of the plastic film as defined by JIS K 7209:2000 in the present invention is favorably 5% or less, more favorably 1% or less.

In addition, when the plastic film is used, the adhesion between the ink-receiving layer and the plastic film can be improved by conducting a surface treatment by a surface oxidation treatment. As examples of the surface oxidation treatment, there are mentioned a corona discharge treatment, a flame treatment, a plasma treatment, a glow discharge treatment and an ozone treatment. These may be used either singly or in any combination thereof. Among these, the ozone treatment is favorable. The treatment rate of the ozone treatment is favorably 10 to 200 W·min/m$^2$, more favorably 50 to 150 W·min/m$^2$.

(3) Cloth

In the present invention, the cloth means that obtained by thinly and widely processing a large amount of fiber in the form of a plate. As the kinds of the fiber, there are mentioned natural fiber, recycled fiber recycled from a material having the nature of the natural fiber or from a plastic, and synthetic fiber obtained by using a polymer such as petroleum as a raw material. As examples of the natural fiber, there are mentioned cotton, silk, hemp, mohair, wool and cashmere. In addition, as examples of the recycled fiber, there are mentioned acetate, cupra, rayon and recycled polyester. Further, as examples of the synthetic fiber, there are mentioned nylon, polyester, acrylic, vinylon, polyethylene, polypropylene, polyamide and polyurethane.

Ink-Receiving Layer

The ink-receiving layer may be provided on only one surface or both surfaces of a sheet-shaped or a film-shaped substrate. In addition, the ink-receiving layer may be a single layer or a multi-layer of two or more layers. When the ink-receiving layer is composed of the multi-layer of two or more layers, however, at least the outermost layer is formed by an ink-receiving layer containing a silica particle satisfying the above-described expressions 1 and 2. The coating weight of the ink-receiving layer on the substrate varies depending on a necessary ink-absorbing capacity or the like and may be suitably selected according to intended properties of the ink-receiving layer. The coating weight of the ink-receiving layer is favorably 15 g/m² or more to 40 g/m² or less in terms of dry coating weight from the viewpoints of more availably utilizing the ink absorbency of the silica particle and more effectively preventing cracking.

Silica Particle

Silica is roughly divided into silica obtained by a wet process and silica obtained by a dry process (gas-phase process) according to a production process thereof. As the wet process, there is known a process in which active silica is produced by acid decomposition of a silicate, this silica is moderately polymerized, and the resultant polymer is aggregated and precipitated to obtain hydrous silica. On the other hand, as the dry process (gas-phase process), there are known a process using high-temperature gas phase hydrolysis of a silicon halide (flame hydrolysis process) and a process of obtaining anhydrous silica by a process in which silica sand and coke are heated, reduced and gasified by an arc in an electric furnace, and then the resultant product is oxidized with air (arc process). In the present invention, the silica obtained by the wet process (hereinafter also referred to as "wet-process silica") is favorably used. As examples of the wet-process silica, there are mentioned precipitated silica and gel-process silica.

As an example of a production process of the gel-process silica, there may be mentioned the following process. First, silica hydrosol is gelled which is produced by causing a silicate to react with an inorganic acid in such a manner that the concentration of $SiO_2$ is 10 to 20% by mass. Incidentally, as examples of the silicate, there are mentioned sodium silicate, potassium silicate and ammonium silicate. However, sodium silicate is often industrially used. In addition, as examples of the inorganic acid, there are mentioned sulfuric acid, nitric acid and hydrochloric acid. However, sulfuric acid is generally used. Here, the concentration of $SiO_2$ is controlled to the above range, whereby uniform and fine silica hydrogel is obtained. When the fine silica hydrogel is used, a silica particle having a small pore radius and a high oil absorption is easily obtained.

When the silica hydrogel obtained by the above process is then washed with water, inorganic acid salts contained in the silica hydrogel are removed.

The silica hydrogel is subjected to a hydrothermal treatment. By the hydrothermal treatment, dissolution and deposition of a primary particle of the silica hydrogel occur to increase the average pore radius and oil adsorption. The temperature suitable for the hydrothermal treatment is 20 to 100° C. A more favorable temperature is 40 to 60° C. If the temperature of the hydrothermal treatment is too high, the average pore radius of the resultant silica gel may become too large in some cases. When the temperature of the hydrothermal treatment is too low to the contrary, the formed silica gel is low in degree of crosslinking and poor in heat stability, and the pore distribution tends to exhibit no peak. The favorable pH of the hydrothermal treatment is 5 to 7.5. The pore radius may become too large in some cases as the pH of the hydrothermal treatment is high. In addition, the treatment time tends to increase as the pH is low.

Thereafter, an acid treatment with an inorganic acid or organic acid having a pH of 2 to 5 is further conducted. By conducting the acid treatment, the dissolution and deposition of the primary particle are inhibited to increase the oil absorption while suppressing the increase of the average pore radius.

The hydrothermal treatment and acid treatment are important processes for determining the physical properties of the silica particle. In addition, since the physical properties of the resulting silica vary depending on the silica raw material and water used, the treatment temperature, pH and time are optimized while measuring the physical properties of the silica to adjust them to intended physical properties of the silica.

This silica hydrogel is then ground and granulated by means of a ball mill or the like so as to give a silica particle having an average particle size of several micro-meters, and the particle is dried for 1 to 100 seconds at a temperature of 100 to 1,000° C., whereby the silica particle can be produced.

The silica particle satisfying the above-described expressions 1 and 2 can be obtained by selecting the production conditions in the above-described production process.

Incidentally, the average pore radius r of the silica particle can be determined by using a recording medium itself as a measurement sample by means of the BJH (Barrett-Joyner-Halenda) method from an adsorption/desorption isotherm of nitrogen gas measured by the nitrogen adsorption/desorption method. Specifically, the average pore radius is a value determined by calculation from the total pore volume and specific surface area measured upon desorption of the nitrogen gas. In addition, the oil absorption V of the silica particle can be measured by the linseed oil droplet method defined in JIS K 5101-13 (ISO 787-5:1980).

The need for the silica particle to have an average pore radius of 5.0 nm or less from the viewpoint of the film strength has been described above. However, the average pore radius of the silica particle is favorably 1.5 nm or more from the viewpoint of better balance between the film strength and the ink absorbency.

The average particle size of the silica particle (secondary particle) may be suitably selected according to intended properties of the ink-receiving layer. The average particle size (diameter) of the silica particle is favorably 3 μm or more to 10 μm or less from the viewpoints of more availably utilizing the ink absorbency of the silica particle and more effectively attaining the film strength.

The average particle size of the silica particle in a dispersed state can be measured by a laser diffraction method.

The average pore radius and oil absorption of the silica particle contained in the ink-receiving layer of the recording medium can be verified according to the following method.

First, the residue obtained by scraping the ink-receiving layer from the recording medium followed by heating for 2 hours at a temperature of 600° C. is the silica particle. That residue is then used as a measurement sample, whereby the average pore radius r (nm) and the oil absorption V (ml/100 g) can be determined by the above-described BJH method and the linseed oil droplet method defined in JIS K 5101-13, respectively. When the values of r and V thus obtained satisfy the above-described expressions 1 and 2, it is found that the silica particle according to the present invention is contained in the ink-receiving layer.

Incidentally, the average particle size of the silica particle can also be determined by using the recording medium as a measurement sample. Specifically, the average value of diameters of particles of the minimum unit that can be recognized as a particle when a section of the recording medium is observed through a scanning electron microscope (SEM) is calculated as an average particle size. The calculation of the average value is performed by observing the section through the scanning electron microscope (SEM), measuring the diameters of arbitrary 100 particles and calculating the number average thereof.

A silica particle which is a raw material for the recording medium may also be directly used to measure the average pore radius, oil absorption and average particle size of the silica particle in addition to the above-described measurements of the average pore radius, oil absorption and average particle size of the silica particle using a recording medium prepared.

Water-Insoluble Resin

A binder means a material capable of binding silica particles to form a film. In the present invention, the binder contains at least a water-insoluble resin. Here, "water-insoluble resin" represents that 95% by mass or more of which remains when the resin is immersed for 2 hours in hot water of 80° C.

As the water-insoluble resin, at least one selected from an acrylic resin, a polycarbonate-modified urethane resin and a polyether-modified urethane resin may be favorably used. The water-insoluble resin is favorably contained in the ink-receiving layer in an amount of 30% by mass to 80% by mass with respect to the silica particle from the viewpoints of more availably utilizing the ink absorbency of the silica particle and more effectively attaining the film strength.

A water-insoluble resin capable of achieving the object and effect of the present invention is favorably selected from water-insoluble resins having a glass transition temperature of 20° C. or less from the viewpoint of attaining better film strength. Incidentally, the glass transition temperature of the resin can be measured by a differential scanning calorimetry (DSC method).

The binder may be formed from only the water-insoluble resin. However, a water-soluble resin may also be contained, as needed, in addition to the water-insoluble resin. As examples of the water-soluble resin, there are mentioned polyvinyl alcohol, polyvinyl pyrrolidone and water-soluble cellulose.

Incidentally, the content of the water-soluble resin is favorably 25% by mass or less, more favorably 20% by mass or less, still more favorably 10% by mass or less to the water-insoluble resin in the ink-receiving layer from the viewpoint of the water resistance.

Respective resins available as the water-insoluble resin will hereinafter be described.

(1) Acrylic Resin

In the present invention, an acrylic resin means a polymer of a (meth)acrylic acid ester. The acrylic resin may be a homopolymer or a copolymer with another monomer so long as the (meth)acrylic acid ester is used as a monomer. Incidentally, "(meth)acrylic acid" means acrylic acid or methacrylic acid.

As examples of the acrylic acid ester, there are mentioned methyl acrylate, ethyl acrylate, butyl acrylate, 2-ethylhexyl acrylate, 2-dimethylaminoethyl acrylate, 2-hydroxyethyl acrylate, 2-hydroxypropyl acrylate, 2-hydroxybutyl acrylate, isobutyl acrylate, octyl acrylate, lauryl acrylate and stearyl acrylate. In addition, as examples of the methacrylic acid ester, there are mentioned methyl methacrylate, ethyl methacrylate, butyl methacrylate, 2-ethylhexyl methacrylate, 2-dimethylaminoethyl methacrylate, 2-hydroxyethyl methacrylate, 2-hydroxypropyl methacrylate, 2-hydroxybutyl methacrylate, isobutyl methacrylate, octyl methacrylate, lauryl methacrylate and stearyl methacrylate. As another monomer capable of copolymerizing with the (meth)acrylic acid ester, there is mentioned a vinyl monomer. As specific example of the vinyl monomer, there are mentioned styrene; styrene derivatives such as vinyltoluene, vinylbenzoic acid, α-methylstyrene, p-hydroxymethylstyrene and styrenesulfonic acid; and vinyl ethers such as methyl vinyl ether, butyl vinyl ether, methoxyethyl vinyl ether, N-vinylpyrrolidone, 2-vinyloxazone and vinylsulfonic acid, and derivatives thereof.

In the present invention, the acrylic resin is favorably a polyacrylic acid ester, a polymethacrylic acid ester or a copolymer of an acrylic acid ester and a methacrylic acid ester. Among others, a copolymer of a methacrylic acid ester having a relatively high glass transition temperature and an acrylic acid ester having a relatively low glass transition temperature is more favorable because the glass transition temperature of the finally obtained acrylic resin can be controlled by the copolymerization ratio thereof.

(2) Urethane Resin (Polycarbonate-Modified Urethane Resin or Polyether-Modified Urethane Resin)

The urethane resin in the present invention means a resin having a urethane linkage. When the binder contains at least one urethane resin in the present invention, this urethane resin is at least one selected from the group consisting of a polycarbonate-modified urethane resin and a polyether-modified urethane resin. Hereinafter, the polycarbonate-modified urethane resin and the polyether-modified urethane resin are also collectively referred to simply as "urethane resin". The urethane resin is favorably a compound obtained by reacting a polyisocyanate, a polyol and a chain extender.

Specifically, as examples of the polyisocyanate, there are mentioned aromatic isocyanates such as tolylene diisocyanate, diphenylmethane diisocyanate, polymeric diphenylmethane diisocyanate, tolidine diisocyanate, naphthalene diisocyanate, xylylene diisocyanate and tetramethylxylylene diisocyanate; aliphatic isocyanates such as hexamethylene diisocyanate and trimethylhexamethylene diisocyanate; and alicyclic isocyanates such as isophorone diisocyanate, cyclohexane-1,3-diisocyanate and cyclohexane-1,4-diisocyanate. These may be used either singly or in any combination thereof.

A polyether-based polyol such as polypropylene glycol, polyethylene glycol or polytetramethylene glycol is used as the polyol, thereby obtaining the polyether-modified urethane resin. In addition, a polycarbonate-based polyol such as polyhexamethylene carbonate is used as the polyol, thereby obtaining the polycarbonate-modified urethane resin. These polyols may be used either singly or in any combination thereof.

A low molecular weight glycol such as ethylene glycol, a low molecular weight diamine or a compound containing an active hydrogen atom, such as a low molecular weight aminoalcohol may be used as the chain extender. These may be used either singly or in any combination thereof.

Other Additives

In the present invention, the ink-receiving layer may contain other additives than the above-described components. As specific examples of the other additives, there are mentioned a crosslinking agent, a pH adjustor, a thickener, a flowability modifier, an antifoaming agent, a foam suppressor, a parting agent, a penetrant, a coloring pigment, a coloring dye, a fluorescent whitening agent, an ultraviolet absorbent, an antioxidant, an antiseptic, a mildewproofing agent, a water-proofing agent, an ink fixative, a curing agent and a weathering material.

As examples of the crosslinking agent, there are mentioned an aldehyde compound, a melamine compound, an isocyanate compound, a zirconium compound, a titanium compound, an amide compound, an aluminum compound, boric acid, a borate, a carbodiimide compound and an oxazoline compound. In addition, another cationic resin than the above-described acrylic resin and urethane resin or a polyvalent metal salt is favorably contained as an ink fixing agent. As examples of the cationic resin, there are mentioned a polyethylene imine resin, a polyamine resin, a polyamide resin, a polyamide epichlorohydrin resin, a polyamine epichlorohydrin resin, a polyamide polyamine epichlorohydrin resin, a polydiallylamine resin and a dicyane diamide condensate. As examples of the polyvalent metal salt, there are mentioned a calcium compound, a magnesium compound, a zirconium compound, a titanium compound and an aluminum compound. Among these, the calcium compound is favorable, and calcium nitrate tetrahydrate is more favorable.

Production Process for Recording Medium

In the present invention, no particular limitation is imposed on the production process for the recording medium. However, a process having a step of preparing a coating liquid for the ink-receiving layer and a step of applying this coating liquid to the substrate is favorable. The production process for the recording medium will hereinafter be described.

In the present invention, as an exemplary process for forming the ink-receiving layer on the substrate, there may be mentioned the following process. First, the coating liquid for the ink-receiving layer is prepared. This coating liquid is then applied to the substrate and dried, whereby the recording medium according to the present invention can be obtained. The coating weight of the coating liquid is favorably 5 g/m² or more to 40 g/m² or less. The coating weight of the coating liquid falls within the above range, whereby both improvement in ink absorbency and improvement in coating stability of the coating liquid can be achieved.

As a coating method of the coating liquid, a roll coater, a blade coater, a bar coater, an air knife coater, a gravure coater, a reverse coater, a transfer coater, a die coater, a kiss coater, a rod coater, a curtain coater, a coater using an extrusion system or a coater using a slide hopper system may be used. Incidentally, the coating liquid may also be heated upon the application thereof.

In addition, a surface treating liquid containing a surface treating agent may also be applied to a surface of the substrate to which the coating liquid is applied prior to the application of the coating liquid for the ink-receiving layer. Thus, the wettability of the substrate for the coating liquid can be improved to improve adhesion between the ink-receiving layer and the substrate. In this case, as examples of the surface treating agent, there are mentioned thermoplastic resins such as an acrylic resin, a polyurethane resin, a polyester resin, a polyethylene resin, a polyvinyl chloride resin, a polypropylene resin, a polyamide resin and a styrene-butadiene copolymer, and a silane coupling agent. These may be used either singly or in any combination thereof. In addition, an inorganic particle may also be contained in the surface treating liquid in such a range as not to impair the effect of the present invention. Titanium oxide, calcium carbonate, silica or alumina may be used as the inorganic particle.

As drying methods after the application, there are mentioned a method of using a hot air dryer such as a linear tunnel dryer, an arch dryer, an air loop dryer or a sine curve air float dryer and a method of using a dryer utilizing infrared rays, heating dryers or microwaves. The heating temperature upon the drying of the coating liquid may be set to, for example, 80 to 130° C.

Image Forming Method

An image can be formed by applying an ink to the ink-receiving layer of the recording medium according to the present invention. In the case where the image is used in uses which require weather resistance such as outdoor display, a pigment ink containing at least a pigment in a dispersed state as a coloring material is favorably used. No particular limitation is imposed on the image forming method. However, an ink jet method using an aqueous pigment ink may be used, and the recording medium according to the present invention can be used suitably for ink jet.

According to an aspect of the present invention, there can be provided a recording medium having an ink-receiving layer excellent in ink absorbency, film strength and water resistance.

EXAMPLES

The present invention will hereinafter be described in more detail by Examples and Comparative Examples. The present invention is not limited by the following Examples at all unless going beyond the gist thereof. Incidentally, "part(s)" in the following description of Examples is based by mass unless expressly noted.

Production of Recording Medium

Preparation of Substrate

NEW YUPO (trademark) FGS110 (product name, product of Yupo Corporation, thickness: 110 μm) which was propylene synthetic paper was provided as a substrate.

Preparation of Silica Particle

Synthetic silica particles synthesized according to the production processes described above in "Silica particle" were used as silica particles in addition to commercially available silica particles. Upon the production of the synthetic silica particles, the pH and temperature of water used in the hydrothermal treatment and the treatment time were suitably controlled, and grinding with a ball mill was performed so as to give a proper average particle size, thereby producing Synthetic Silica Particles 1 to 7 shown in Table 1.

Incidentally, the average particle sizes of the silica particles used were measured by Laser Diffraction Particle Size Analyzer SALD-2300 manufactured by Shimadzu Corporation. The average pore radius r was calculated by using the BJH (Barrett-Joyner-Halenda) method from an adsorption/desorption isotherm of nitrogen gas measured by Micromeritics Tristar-3000 manufactured by Shimadzu Corporation. In addition, the oil absorption V of the silica particle was measured by the linseed oil droplet method defined in JIS K 5101-13. The results are shown in Table 1 collectively.

TABLE 1

| Silica particle | kind | r (nm) | V (ml/100 g) | V/r | Average particle size (μm) |
|---|---|---|---|---|---|
| 1 | SYLYSIA 660 | 2.2 | 230 | 105 | 5 |
| 2 | Synthetic Silica 1 | 4.8 | 400 | 83 | 5 |

TABLE 1-continued

| Silica particle | kind | r (nm) | V (ml/100 g) | V/r | Average particle size (μm) |
|---|---|---|---|---|---|
| 3 | NIPGEL BY-400 | 4.7 | 230 | 49 | 4 |
| 4 | SYLYSIA 440 | 5.2 | 220 | 42 | 6 |
| 5 | MIZUKASIL P78F | 4.0 | 230 | 58 | 18 |
| 6 | NIPGEL BY-800 | 5.1 | 215 | 42 | 9 |
| 7 | Synthetic Silica 7 | 4.0 | 260 | 65 | 5 |
| 8 | Synthetic Silica 2 | 2.4 | 217 | 90 | 5 |
| 9 | Synthetic Silica 3 | 2.2 | 260 | 118 | 2.5 |
| 10 | Synthetic Silica 4 | 2.2 | 250 | 114 | 3 |
| 11 | Synthetic Silica 5 | 2.2 | 210 | 95 | 10 |
| 12 | Synthetic Silica 6 | 2.2 | 200 | 91 | 11 |

Incidentally, the product names and manufacturers of the commercially available silica particles shown in Table 1 are as follows:
SYLYSIA 660 (product of Fuji Sylisia Chemical Ltd.)
SYLYSIA 440 (product of Fuji Sylisia Chemical Ltd.)
MIZUKASIL P78F (product of Mizusawa Industrial Chemicals, Ltd.)
NIPGEL BY-400 (product of Tosoh Silica Corporation)
NIPGEL BY-800 (product of Tosoh Silica Corporation).

Preparation of Silica Dispersion Liquids 1 to 12

Respective Silica Dispersion Liquids 1 to 12 were prepared by using Silica Particles 1 to 12 shown in Table 1 as the silica particles, adding them into pure water in such a manner that the respective solid contents thereof are 18.0% by mass and conducting stirring by a mixer for 30 minutes.

Preparation of Coating Liquids A to W

Silica Dispersion Liquid 1 to 12 and water-insoluble resins were adjusted so as to give respective solid contents by mass as shown in the following Table 2 and conducting adjustment with water so as to prepare Coating Liquids A to W each having a solid content of 18% by mass. Incidentally, the numbers in the column of Silica Dispersion Liquids in Table 2 correspond to the numbers of the silica particles shown in Table 1. In addition, in Coating Liquid N, PVA 235 (polyvinyl alcohol produced by Kuraray Co., Ltd.) which is a water-soluble resin was used in place of the water-insoluble resin.

TABLE 2

| Coating Liquid | Silica Dispersion Liquid No. | Silica Dispersion Liquid Solid content (parts by mass) | Water-insoluble resin Product name | Water-insoluble resin Tg (° C.) | Water-insoluble resin Solid content (parts by mass) |
|---|---|---|---|---|---|
| A | 1 | 100 | Mowinyl 7820 | 4 | 58.3 |
| B | 1 | 100 | Mowinyl 7720 | 4 | 58.3 |
| C | 1 | 100 | Hydran WLS-201 | −50 | 58.3 |
| D | 1 | 100 | Hydran WLS-210 | −15 | 58.3 |
| E | 1 | 100 | Mowinyl 7540 | 18 | 58.3 |
| F | 1 | 100 | Fonlone T-733 | 23 | 58.3 |
| G | 2 | 100 | Mowinyl 7720 | 4 | 58.3 |
| H | 3 | 100 | Mowinyl 7820 | 4 | 58.3 |
| I | 4 | 100 | Mowinyl 7720 | 4 | 58.3 |
| J | 5 | 100 | Hydran WLS-201 | −50 | 58.3 |
| K | 6 | 100 | Hydran WLS-210 | −15 | 58.3 |
| L | 7 | 100 | Mowinyl 7820 | 4 | 58.3 |
| N | 8 | 100 | Mowinyl 7720 | 4 | 58.3 |
| N | 1 | 100 | — | — | — |
| O | 9 | 100 | Mowinyl 7820 | 4 | 58.3 |
| P | 10 | 100 | Mowinyl 7720 | 4 | 58.3 |
| Q | 11 | 100 | Hydran WLS-201 | −50 | 58.3 |
| R | 12 | 100 | Hydran WLS-210 | −15 | 58.3 |
| S | 1 | 100 | Mowinyl 7820 | 4 | 25 |
| T | 1 | 100 | Mowinyl 7720 | 4 | 30 |
| U | 1 | 100 | Hydran WLS-201 | −50 | 80 |
| V | 1 | 100 | Hydran WLS-210 | −15 | 85 |
| W | 2 | 100 | Superflex 620 | 43 | 30 |

Incidentally, the manufacturers of the water-insoluble resins (binders) shown in Table 2 are as follows:
Mowinyl 7820 (acrylic resin produce by The Nippon Synthetic Chemical Industry Co., Ltd.)
Mowinyl 7720 (acrylic resin produce by The Nippon Synthetic Chemical Industry Co., Ltd.)
Mowinyl 7540 (acrylic resin produce by The Nippon Synthetic Chemical Industry Co., Ltd.)
Fonlone T-733 (acrylic resin produced by Mitsui Chemicals, Inc.)
Hydran WLS210 (polycarbonate-modified urethane resin produced by DIC Corporation)
Hydran WLS201 (polyether-modified urethane resin produced by DIC Corporation)
Superflex 620 (polyester-based urethane resin produced by DKS Co., Ltd.).

Examples 1 to 17 and Comparative Examples 1 to 6 (Preparation of Recording Medium)

Coating Liquids A to W were respectively applied on to substrates by a bar coater and dried with hot air of 115° C. to form respective ink-receiving layers each having a thickness of 30 μm, thereby obtaining recording media of Examples 1 to 17 and Comparative Examples 1 to 6.

The water resistance, ink absorbency and film strength of the thus-obtained recording media were evaluated according to the following respective methods, and the evaluated results are shown in Table 3. Evaluation rank 3 or higher was regarded as being within a practical range.

Evaluation Method of Ink Absorbency

A solid image was recorded on each of the recording media by using an ink jet recording apparatus imagePRO-GRAF iPF6400 (manufactured by Canon Inc.) with a cyan ink installed in this apparatus at a printing mode of synthetic paper (starch-free) standard mode. The degree of absorption of the ink just after the printing was visually observed to evaluate the respective recording media according to the following evaluation criteria. The recording conditions were set to 23° C./50%.
5: The ink was absorbed within 3 seconds after the printing;
4: The ink was absorbed within 5 seconds but over 3 seconds after the printing;
3: The ink was absorbed within 8 seconds but over 5 seconds after the printing;

2: The ink was absorbed within 10 seconds but over 8 seconds after the printing;
1: The ink was not absorbed even over 10 seconds after the printing.

Evaluation Method of Film Strength

Black paper New Color R (product of Lintec Corporation) was pressed against a surface of the ink-receiving layer of each of the resultant recording media with a load of 500 g/cm² and was bidirectionally scanned 20 times within the same region by means of a testing machine. A Color Fastness Rubbing Tester (manufactured by TESTER SANGYO CO., LTD) was used as the testing machine. After completion of the bidirectional rubbing treatment, the OD (optical densities) of a portion of the black paper which came into no contact with the surface of the ink-receiving layer and that of a portion of the black paper which came into contact with the surface of the ink-receiving layer were measured by means of an optical reflection densitometer, 500 Spectral Densitometer (manufactured by X-Rite Co.). The film strength of the ink-receiving layer was determined according to the following calculation formula from the resultant measured values.

Film strength (%)=(OD of the black paper which came into contact with the surface of the ink-receiving layer/OD of the black paper which came into no contact with the surface of the ink-receiving layer)×100.

The film strength was evaluated according to the following criterion.
5: The film strength is 90% or more;
4: The film strength is 80% or more and less than 90%;
3: The film strength is 70% or more and less than 80%;
2: The film strength is 60% or more and less than 70%;
1: The film strength is less than 60%.

Evaluation Method of Water Resistance

Running water of 50° C. was caused to flow for 48 hours on a surface of each of the resultant recording media, and the surface was dried overnight. The water resistance was evaluated by a difference D between the film strength Sa before the running water test and the film strength Sb after the running water test (D=Sa−Sb). The film strength was evaluated by the above-described evaluation method. The water resistance was evaluated according to the following criterion.
5: D is 10% or less;
4: D is more than 10% to 20% or less;
3: D is more than 20% to 25% or less;
2: D is more than 25% to 30% or less;
1: D is more than 30%.

TABLE 3

| Recording medium | Coating Liquid | Water resistance | Ink absorbency | Film strength |
|---|---|---|---|---|
| | | Evaluated result | | |
| Example 1 | A | 5 | 5 | 5 |
| Example 2 | B | 5 | 5 | 5 |
| Example 3 | C | 5 | 5 | 5 |
| Example 4 | D | 5 | 5 | 5 |
| Example 5 | E | 5 | 5 | 4 |
| Example 6 | F | 5 | 5 | 3 |
| Example 7 | G | 5 | 4 | 4 |
| Example 8 | M | 5 | 3 | 5 |
| Example 9 | O | 5 | 3 | 5 |
| Example 10 | P | 5 | 4 | 5 |
| Example 11 | Q | 5 | 5 | 4 |
| Example 12 | R | 5 | 5 | 3 |

TABLE 3-continued

| Recording medium | Coating Liquid | Water resistance | Ink absorbency | Film strength |
|---|---|---|---|---|
| | | Evaluated result | | |
| Example 13 | S | 5 | 5 | 3 |
| Example 14 | T | 5 | 5 | 4 |
| Example 15 | U | 5 | 4 | 5 |
| Example 16 | V | 5 | 3 | 5 |
| Example 17 | W | 3 | 4 | 3 |
| Comparative Example 1 | H | 5 | 1 | 3 |
| Comparative Example 2 | I | 5 | 1 | 2 |
| Comparative Example 3 | J | 5 | 2 | 3 |
| Comparative Example 4 | K | 5 | 1 | 2 |
| Comparative Example 5 | L | 5 | 2 | 4 |
| Comparative Example 6 | N | 1 | 5 | 5 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-072671, filed Mar. 31, 2016, which is hereby incorporated by reference herein in its entirety.

What is claimed is:

1. A recording medium comprising:
a substrate; and
an ink-receiving layer provided on the substrate,
wherein the ink-receiving layer comprises a silica particle and a water-insoluble resin, and
wherein the silica particle satisfies the following expressions 1 and 2 when an average pore radius thereof determined by the BJH method is taken as r (nm), and an oil absorption thereof measured by the linseed oil droplet method is taken as V (ml/100 g):

$$r \leq 5.0 \text{ (nm); and} \qquad \text{expression 1:}$$

$$V/r \geq 80 \text{ ((ml/100 g)/nm).} \qquad \text{expression 2:}$$

2. The recording medium according to claim 1, wherein the water-insoluble resin (i) comprises at least one selected from the group consisting of an acrylic resin, a polycarbonate-modified urethane resin, and a polyether-modified urethane resin, and (ii) is contained in an amount of 30% to 80% by mass with respect to the content of the silica particle.

3. The recording medium according to claim 1, wherein a glass transition temperature of the water-insoluble resin is 20° C. or less.

4. The recording medium according to claim 1, wherein an average particle size of the silica particle is 3 μm or more to 10 μm or less.

5. The recording medium according to claim 1, for use in ink jet.

6. The recording medium according to claim 1, wherein the expression 1 is 2.2 (nm)≤r≤5.0 (nm).

7. The recording medium according to claim 1, wherein the expression 2 is 118 ((ml/100 g)/nm)≥V/r≥80 ((ml/100 g)/nm).

8. The recording medium according to claim 1, wherein a content of a water-soluble resin is 0% by mass or more to 10% by mass or less with respect to a content of the water-insoluble resin in the ink-receiving layer.

9. The recording medium according to claim 8, wherein the water-soluble resin comprises at least one selected from the group consisting of a polyvinyl alcohol, a polyvinyl pyrrolidone, and a water-soluble cellulose.

10. The recording medium according to claim 1, wherein a glass transition temperature of the water-insoluble resin is −50° C. or more to 20° C. or less.

* * * * *